(12) United States Patent
Holland et al.

(10) Patent No.: US 12,326,161 B1
(45) Date of Patent: Jun. 10, 2025

(54) WARM-UP OIL MANAGEMENT STRATEGY

(71) Applicant: Deere & Company, Moline, IL (US)

(72) Inventors: Michael A Holland, Conrad, IA (US); Clayton P. Neumann, Cedar Falls, IA (US); Greg R. Long, Clay City, IN (US)

(73) Assignee: Deere & Company, Moline, IL (US)

( * ) Notice: Subject to any disclaimer, the term of this patent is extended or adjusted under 35 U.S.C. 154(b) by 12 days.

(21) Appl. No.: 18/533,430

(22) Filed: Dec. 8, 2023

(51) Int. Cl.
| | |
|---|---|
| *F15B 21/0427* | (2019.01) |
| *F16H 57/04* | (2010.01) |
| *F16H 61/00* | (2006.01) |
| *F16N 7/38* | (2006.01) |
| *F16N 39/04* | (2006.01) |
| *B60R 16/08* | (2006.01) |
| *B60R 17/02* | (2006.01) |

(52) U.S. Cl.
CPC ..... *F15B 21/0427* (2019.01); *F16H 57/0402* (2013.01); *F16H 57/0412* (2013.01); *F16H 57/0413* (2013.01); *F16H 61/0021* (2013.01); *F16N 7/38* (2013.01); *F16N 39/04* (2013.01); *B60R 16/08* (2013.01); *B60R 17/02* (2013.01); *F15B 2211/611* (2013.01); *F15B 2211/62* (2013.01); *F16H 2061/0037* (2013.01)

(58) Field of Classification Search
CPC ........... F15B 21/0427; F15B 2211/611; F15B 2211/62; F16N 7/38; F16N 39/04; F16N 39/06; F16H 57/0402; F16H 57/0412; F16H 57/0413; F16H 61/0021; F16H 2061/0037

See application file for complete search history.

(56) References Cited

U.S. PATENT DOCUMENTS

| | | | | |
|---|---|---|---|---|
| 5,020,324 | A  * | 6/1991 | MacDonald | .......... F04B 49/007 417/252 |
| 5,115,887 | A  * | 5/1992 | Smith | ................. F16H 57/0447 184/6.12 |
| 7,954,317 | B2 * | 6/2011 | Bitter | ..................... F04B 23/10 60/486 |
| 9,671,009 | B2 * | 6/2017 | Nystrom | ............. F16H 57/0441 |
| 10,132,338 | B2 | 11/2018 | Kenkel et al. | |
| 11,091,899 | B1 | 8/2021 | Kenkel et al. | |
| 11,585,428 | B2 | 2/2023 | Reid et al. | |
| 2014/0338320 | A1* | 11/2014 | Morselli | ................... F15B 1/26 60/416 |
| 2018/0229623 | A1* | 8/2018 | Baeumler | ........... B60L 15/2054 |

* cited by examiner

*Primary Examiner* — Matthew Wiblin
(74) *Attorney, Agent, or Firm* — Lucian Wayne Beavers; Patterson Intellectual Property Law PC

(57) ABSTRACT

A hydraulic system of a work vehicle includes a recirculation valve which may be closed during a warm-up mode of operation so that conditioning hydraulic fluid from a conditioning hydraulic fluid pump flows through a high pressure relief valve to a conditioning hydraulic fluid reservoir and recirculates from the conditioning hydraulic fluid reservoir back to the conditioning hydraulic fluid pump. Subsequent to the warm-up mode of operation, the recirculation valve may be opened so that conditioning hydraulic fluid from the conditioning hydraulic fluid pump flows through a low pressure relief valve to a main hydraulic fluid reservoir.

18 Claims, 7 Drawing Sheets

WARM-UP OIL MANAGEMENT STRATEGY

FIELD OF THE DISCLOSURE

The present disclosure relates to a hydraulic system of a work vehicle configured to provide a warm-up mode of operation.

BACKGROUND

In traditional work vehicles during start up of the vehicle when the hydraulic oil is in a highly viscous state, there is a risk of oil stacking at various locations in the hydraulic circuit and there is a risk of pump starvation. Also, the filter in the hydraulic circuit may bypass due to the high pressure differential across the filter, leading to circulation of unfiltered dirty oil to critical parts of the hydraulic circuit.

SUMMARY OF THE DISCLOSURE

The present disclosure provides a hydraulic system for a work vehicle including a warm-up mode which in various embodiments can avoid or reduce some or all of these problems.

In an embodiment a work vehicle includes first and second drivetrain components, a main hydraulic fluid reservoir and a conditioning hydraulic fluid reservoir. A variable flow conditioning hydraulic fluid source is configured to intake conditioning hydraulic fluid from the conditioning hydraulic fluid reservoir and provide conditioning hydraulic fluid under pressure to a conditioning hydraulic fluid discharge line. A control manifold includes first and second control valves configured to control flow of conditioning hydraulic fluid from the conditioning hydraulic fluid discharge line to the first and second drivetrain components, respectively, to lubricate and cool the first and second drivetrain components. A filter is disposed in the conditioning hydraulic fluid discharge line. A filter bypass is configured to flow conditioning hydraulic fluid through the conditioning hydraulic fluid discharge line without passing the conditioning hydraulic fluid through the filter when a pressure differential across the filter exceeds a set pressure differential value. A low pressure relief valve is configured to communicate the conditioning hydraulic fluid discharge line with the main hydraulic fluid reservoir. A high pressure relief valve is configured to communicate the conditioning hydraulic fluid discharge line with the conditioning hydraulic fluid reservoir. A recirculation valve is configured to selectively block flow through the low pressure relief valve and thereby cause flow from the conditioning hydraulic fluid discharge line to flow through the high pressure relief valve to the conditioning hydraulic fluid reservoir.

In another embodiment a method is provided of operating such a work vehicle. The method may include: maintaining the recirculation valve closed during a warm-up mode of operation so that conditioning hydraulic fluid from the conditioning hydraulic fluid discharge line flows through the high pressure relief valve to the conditioning hydraulic fluid reservoir and recirculates from the conditioning hydraulic fluid reservoir back to the variable flow conditioning hydraulic fluid source; and subsequent to the warm-up mode of operation, opening the recirculation valve so that conditioning hydraulic fluid from the conditioning hydraulic fluid discharge line flows through the low pressure relief valve to the main hydraulic fluid reservoir.

Numerous objects, features and advantages of the present invention will be readily apparent to those skilled in the art upon a review of following description in conjunction with the accompanying drawings.

DETAILED DESCRIPTION

Figure 1:
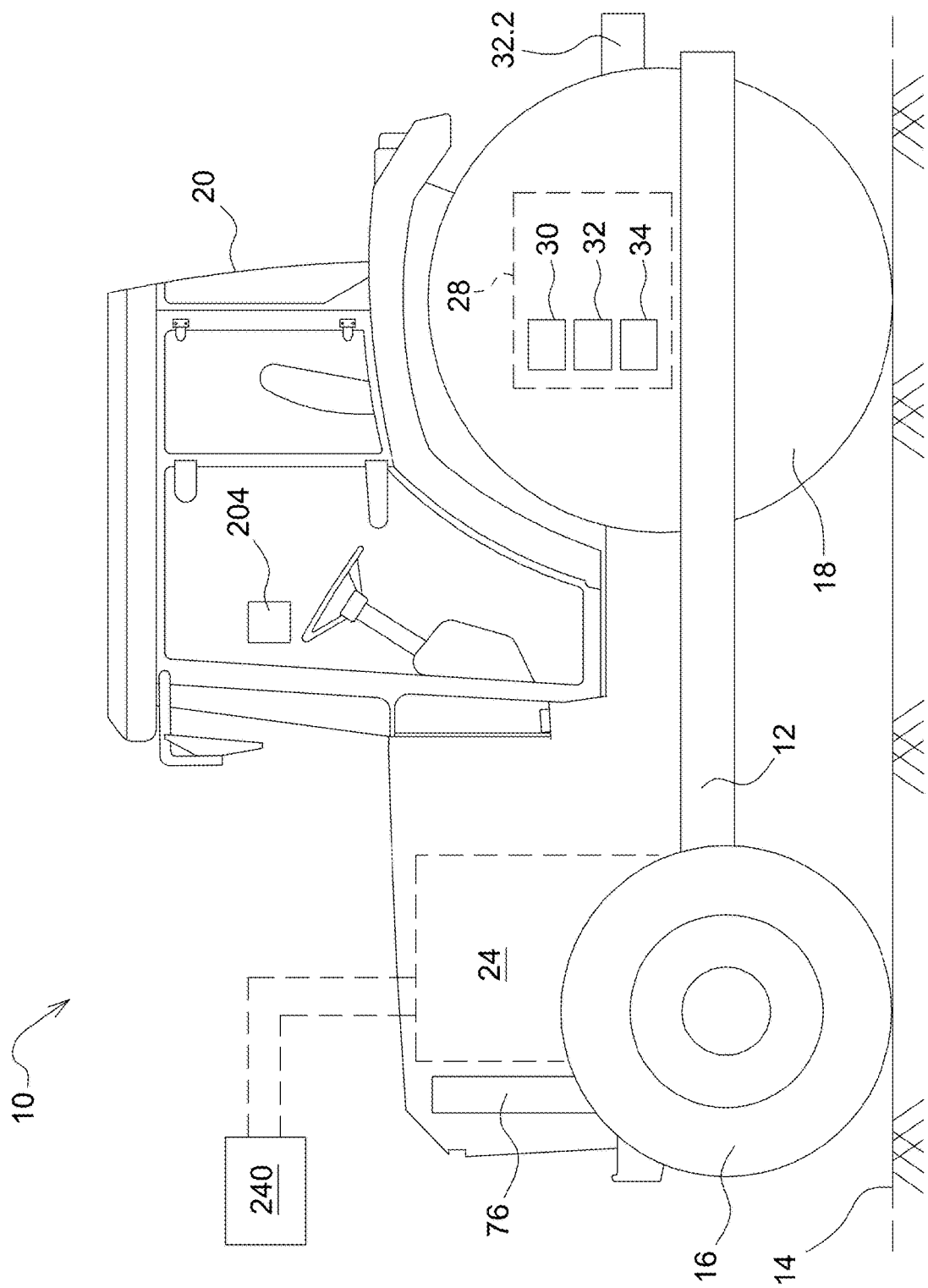
FIG. 1 is a schematic left side view of a work vehicle, for example a battery electric powered tractor.

FIG. 1 schematically shows a left side view of a work vehicle 10. The work vehicle 10 is illustrated in the context of a battery electric powered tractor, but as will be seen many of the aspects of the present invention may also be utilized in the context of a traditional internal combustion engine powered tractor or other work vehicle.

The work vehicle 10 includes a machine frame 12, supported from the ground surface 14 by a pair of front wheels 16 and a pair of rear wheels 18. Tracks may also be used in place of wheels. An operator's cab 20 is located above a rear portion of the machine frame 12. A hood 22 covers a front portion of the machine frame. In the case of a traditional internal combustion engine powered tractor the internal combustion engine is located within the area of the hood 22. In the context of a battery electric powered tractor a main battery bank 24 is located in the area of the hood 22.

The work vehicle 10 includes a transaxle assembly 26 located below the operator's cabin 20 and between the rear wheels 18. The transaxle assembly 26 includes a transaxle case 28 which houses a plurality of vehicle drivetrain components including first, second and third vehicle drivetrain components 30, 32 and 34, respectively.

Figure 3:
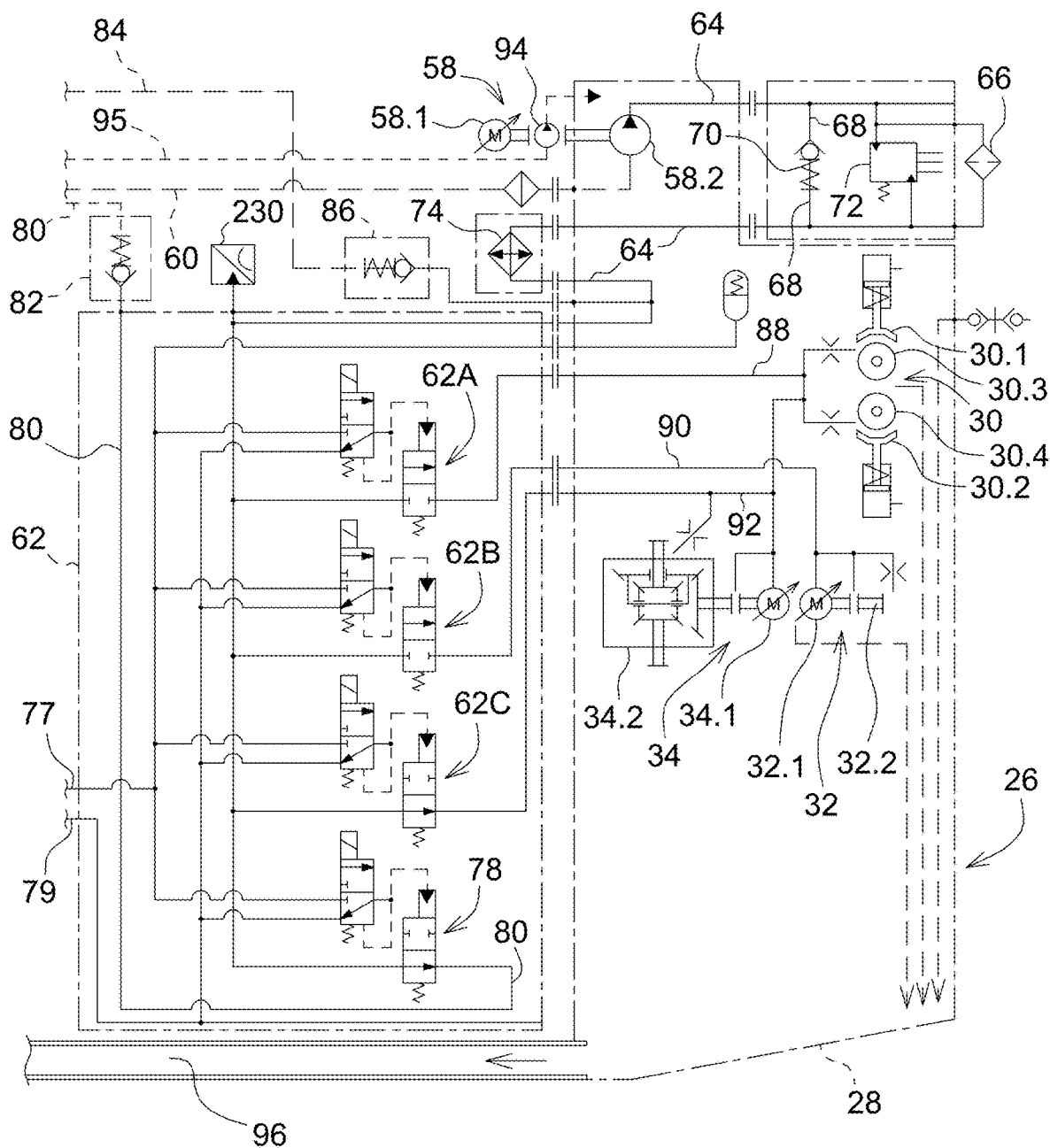
FIG. 3 is a more detailed hydraulic schematic of portions of the hydraulic system of FIG. 2.

The first vehicle drivetrain component 30 may for example be a vehicle brake system 30. As schematically shown in FIG. 3, the vehicle brake system 30 may include multiple calipers 30.1, 30.2 engaging brake discs 30.3, 30.4 located within the transaxle case 28.

The second vehicle drivetrain component 32 may for example be a power take off system 32. As schematically shown in FIG. 3 the power take off system 32 may include an electric motor 32.1 driving a power take off shaft 32.2.

The third vehicle drivetrain component 34 may for example be a traction drive system 34. As schematically shown in FIG. 3 the traction drive system 34 may include an electric motor 34.1 driving a mechanical gear differential system 34.2 to drive the rear wheels 18 and/or front wheels 16.

The terms first, second, and third are intended only as names to differentiate the various vehicle drivetrain components and no order of operation is required for the components.

As is further explained below, the vehicle drivetrain components 30, 32, and 34 are located within the transaxle case 28 so that conditioning hydraulic fluid provided to the vehicle drivetrain components to lubricate and cool those components may be collected in the lower portion of the transaxle case 28 and returned to a conditioning hydraulic fluid system.

Figure 2:
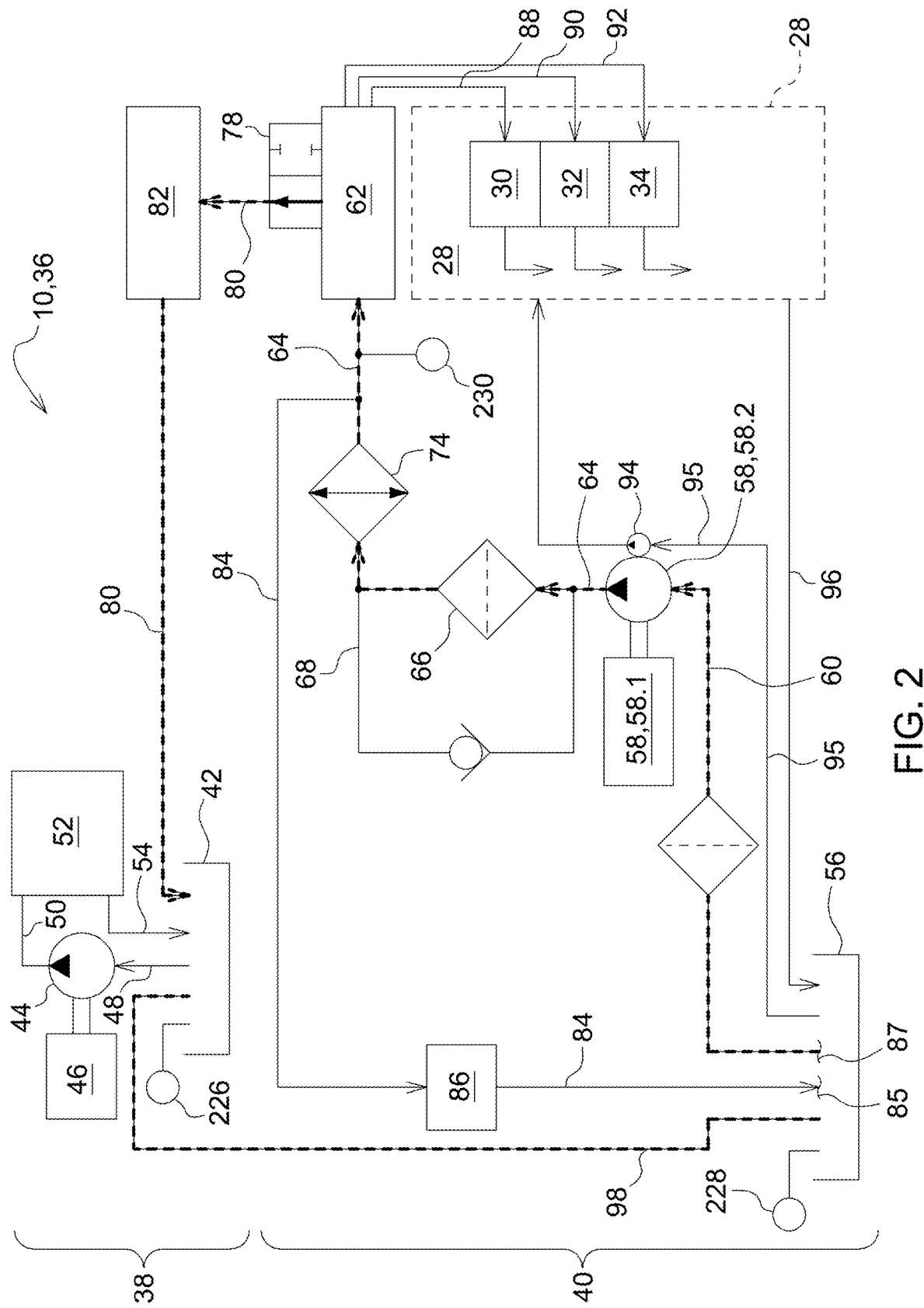
FIG. 2 is a hydraulic schematic for the work vehicle of FIG. 1, showing a recirculating valve in an open position. A normal operating flow path of a conditioning hydraulic fluid system is highlighted by a heavy dashed line.
Figure 4:
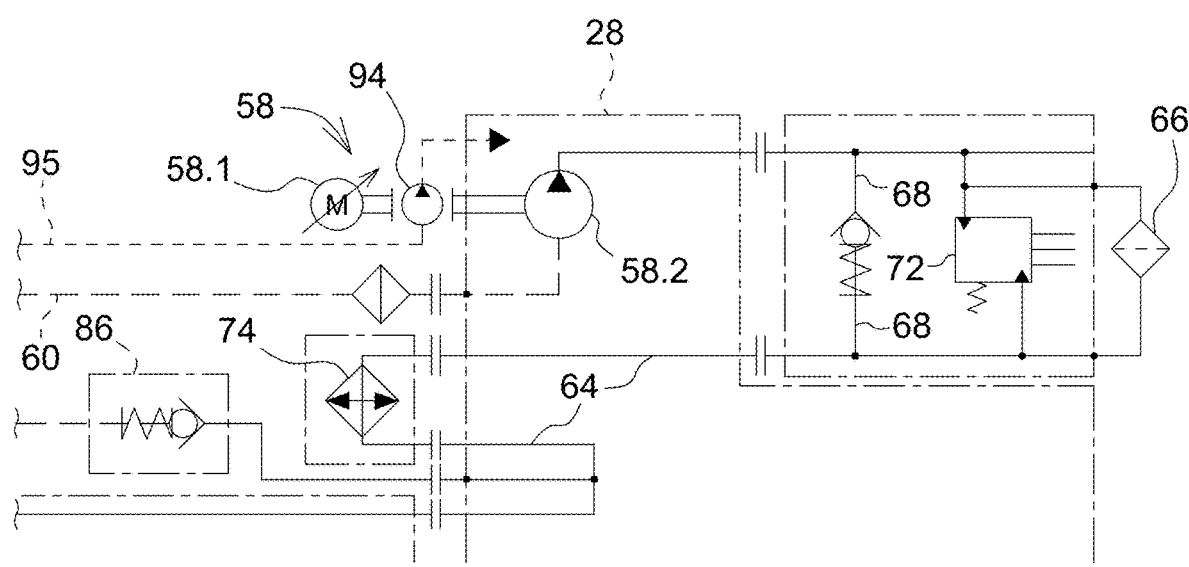
FIG. 4 is an enlarged view of the portion of FIG. 3 dealing with the filter and filter bypass.

FIG. 2 provides a high level schematic illustration of a hydraulic system 36 of the work vehicle 10, and FIGS. 3 and 4 provide more detailed schematic illustrations of portions of the hydraulic system 36. The hydraulic system 36 includes an operating hydraulic fluid system 38 and a conditioning hydraulic fluid system 40.

The operating hydraulic fluid system 38 includes an operating hydraulic fluid reservoir 42, which is also sometimes referred to as a main hydraulic fluid reservoir 42 or a clean hydraulic fluid reservoir 42. A main or operating hydraulic fluid pump 44 is powered by an electric motor 46. Pump 44 draws operating hydraulic fluid from reservoir 42 though suction line 48 and provides operating hydraulic fluid under pressure through operating fluid supply line 50 to a plurality of hydraulic actuators 52 of the work vehicle 10. Hydraulic fluid from the actuators 52 returns to the reservoir 42 through return line 54. The plurality of actuators 52 may include all the traditional hydraulic actuators of a tractor, including for example, front lift cylinders, rear hitch lift cylinders, and the various selective control valves which provide hydraulic power connections for the many accessories which may be attached to the tractor.

The present disclosure provides the conditioning hydraulic fluid system 40 which is separately controlled from the operating hydraulic fluid system 38. As will be seen this allows for many efficiencies to be created in the management of the conditioning hydraulic fluid system 40.

The conditioning hydraulic fluid system 40 includes a conditioning hydraulic fluid reservoir 56 which is separate from the main hydraulic fluid reservoir 42. A variable flow conditioning hydraulic fluid source 58 is configured to intake conditioning hydraulic fluid from the conditioning hydraulic fluid reservoir 56 via a conditioning hydraulic fluid supply path 60 connecting the conditioning hydraulic fluid reservoir 56 to the variable flow conditioning hydraulic fluid source 58.

In the embodiment illustrated the variable flow conditioning hydraulic fluid source 58 includes a variable speed electric drive motor 58.1 and a fixed displacement hydraulic pump 58.2 driven by the variable speed electric drive motor 58.1. The variable speed electric drive motor may have an inverter/controller associated therewith which will provide motor control by generating proper control frequency and current to the motor to achieve the torque and speed requirements for the pump 58.2.

In one alternative embodiment the variable flow conditioning hydraulic fluid source 58 may include a fixed speed drive motor and a variable displacement hydraulic pump driven by the fixed speed drive motor.

In another alternative embodiment the variable flow conditioning hydraulic fluid source 58 may include a variable speed drive motor and a variable displacement hydraulic pump driven by the variable speed drive motor.

A control manifold 62 includes a plurality of control valves, each of the control valves being configured to control flow of conditioning hydraulic fluid from the variable flow conditioning hydraulic fluid source 58 to one or more of the plurality of drivetrain components 30, 32, 34 to lubricate and cool the drivetrain components. A conditioning hydraulic fluid discharge line 64 communicates the variable flow conditioning hydraulic fluid source 58 with the control manifold 62.

A filter 66 is disposed in the conditioning hydraulic fluid discharge line 64 to filter and clean the conditioning hydraulic fluid flowing therethrough. The details of the filter 66 and associated components are best shown in FIG. 4. A filter bypass 68 is configured to flow conditioning hydraulic fluid through the conditioning hydraulic fluid discharge line 64 without passing the conditioning hydraulic fluid through the filter 66 when a differential pressure across the filter 66 exceeds a set pressure differential value. The filter bypass 66 may include a bypass valve 70, the configuration of which determines the set pressure differential value. A filter restriction sensor 72 may detect and measure a pressure differential across the filter 66.

A WEG (water-ethylene-glycol) heat exchanger 74 is disposed in the conditioning hydraulic fluid discharge line 64 downstream of the filter 66. The WEG heat exchanger 74 serves to cool the conditioning hydraulic fluid flowing through the conditioning fluid discharge line 64. The WEG heat exchanger 74 transfers heat from the conditioning hydraulic fluid to a water-ethylene-glycol mixture which then flows through a traditional radiator 76 (see FIG. 1) which may be located in the front of the work vehicle 10.

The conditioning hydraulic fluid discharge line 64 supplies conditioning hydraulic fluid to a plurality of control valves 62A, 62B and 62C which are part of the control manifold 62. These may be referred to as first, second and third control valves 62A, 62B and 62C which are associated with the first, second and third vehicle drivetrain components 30, 32 and 34, respectively.

In the embodiment illustrated in FIG. 3 each of the control valves 62A, 62B and 62C is shown as a pilot operated on/off valve. Also shown in FIG. 3 are a pilot hydraulic fluid supply line 77 and a pilot hydraulic fluid return line 79. Alternatively, each of the control valves may be a proportional control valve.

The control manifold 62 also includes a recirculation valve 78 disposed in a low pressure return line 80 which communicates the conditioning hydraulic fluid discharge line or path 64 with the main hydraulic fluid reservoir 42. The recirculation valve 78 may also be referred to as a blocking valve 78. A low pressure relief valve 82 is disposed in the low pressure return line downstream of the recirculation valve 78. As is further described below, during normal operation the recirculation valve 78 is in an open position as shown in FIG. 2 and conditioning hydraulic fluid returns to the main hydraulic fluid reservoir 42. Also, during normal operation, any excess hydraulic fluid building up in the main hydraulic fluid reservoir 42 may overflow back into the conditioning hydraulic fluid reservoir 56 through spill over transfer line 98, which may also be referred to as a make-up line 98.

Figure 2A:
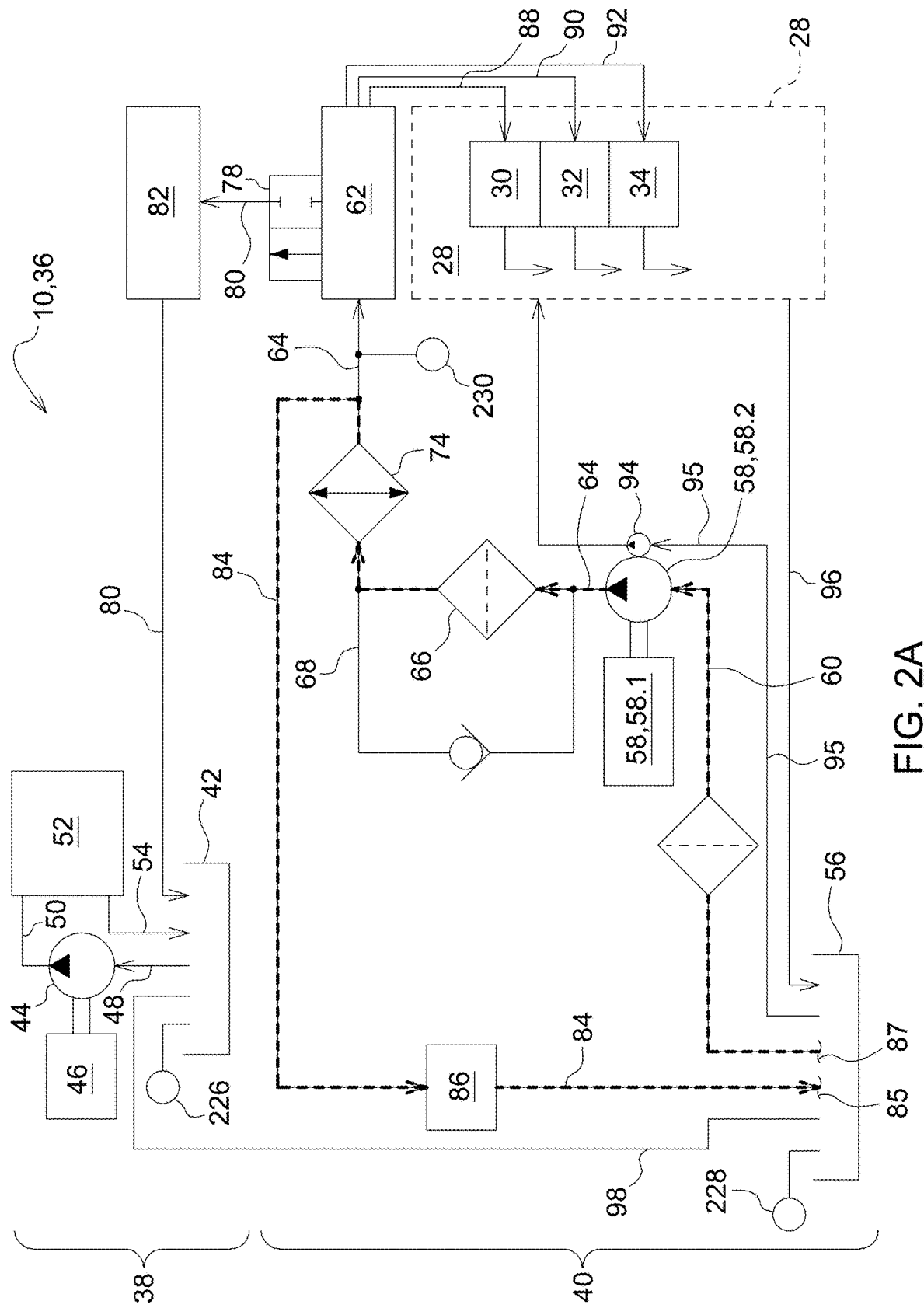
FIG. 2A is a hydraulic schematic similar to FIG. 2, but showing the recirculating valve in a closed position. A recirculating or warm-up operating flow path of the conditioning hydraulic fluid system is highlighted by a heavy dashed line.

Upstream of the recirculation valve 78 a high pressure return line 84 communicates the conditioning hydraulic fluid discharge line 64 with the conditioning hydraulic fluid reservoir 56. A high pressure relief valve 86 is disposed in the high pressure return line 84. In various situations, as described below, the recirculation valve 78 may be moved to a closed position as shown in FIG. 2A, thereby blocking the low pressure relief valve 82 and causing the conditioning hydraulic fluid to be returned through the high pressure return line 84 to the conditioning hydraulic fluid reservoir 56. The recirculation valve 78 may be described as being configured to selectively block flow through the low pressure relief valve 82 and thereby cause flow from the conditioning hydraulic fluid discharge line 64 to flow through the high pressure relief valve 86 to the conditioning hydraulic fluid reservoir 56. Closing of the recirculation valve 78 also causes lubrication pressure in the conditioning hydraulic fluid discharge line 64 to be raised. During normal operation the lubrication pressure in the conditioning hydraulic fluid discharge line 64 should be approximately at the level determined by the relief pressure of the low pressure relief valve 82. During recirculating operation when the recirculation valve 78 is closed, the lubrication pressure in the conditioning hydraulic fluid discharge line 64 should be approximately at the level determined by the relief pressure of the high pressure relief valve 86.

As used herein the terms low pressure relief valve 82 and high pressure relief valve 86 are relative terms, and only mean that the relief pressure of the low pressure relief valve 82 is lower than that of the high pressure relief valve 86. In one embodiment the low pressure relief valve 82 may be configured for a relief pressure in a range of 14 psi to 45 psi, and the high pressure relief valve 86 may be configured for a relief pressure in a range of 80 psi to 150 psi.

As previously noted the first, second and third control valves 62A, 62B and 62C control flow of conditioning hydraulic fluid to the vehicle brake system 30, the power take off system 32, and the traction drive system 34 through lubrication lines 88, 90 and 92, respectively. The conditioning hydraulic fluid flowing to the vehicle brake system 30 may flow over the calipers 30.1, 30.2 and brake discs 30.3 and 30.4 to cool the same, and the used conditioning hydraulic fluid then collects in the bottom of the transaxle case 28. The conditioning hydraulic fluid flowing to the power take off system 32 may cool the electric motor 32.1 and rotating components associated with the power take off shaft 32.2 to lubricate and cool the same, and the used conditioning hydraulic fluid then collects in the bottom of the transaxle case 28. The conditioning hydraulic fluid flowing to the traction drive system 34 may cool the electric motor 34.1 and cool and lubricate the rotating mechanical components associated with the mechanical gear differential 34.2, and the used conditioning hydraulic fluid then collects in the bottom of the transaxle case 28. The transaxle case 28 is pressurized with air via an air compressor 94, which aids the used conditioning hydraulic fluid which has collected in the bottom of transaxle case 28 to flow through a used fluid return line 96 to the conditioning hydraulic fluid reservoir 56. As schematically shown in FIG. 2, the air compressor 94 may draw air from a breather vent line 95 connected to the upper portion of the conditioning hydraulic fluid reservoir 56.

Figure 5:
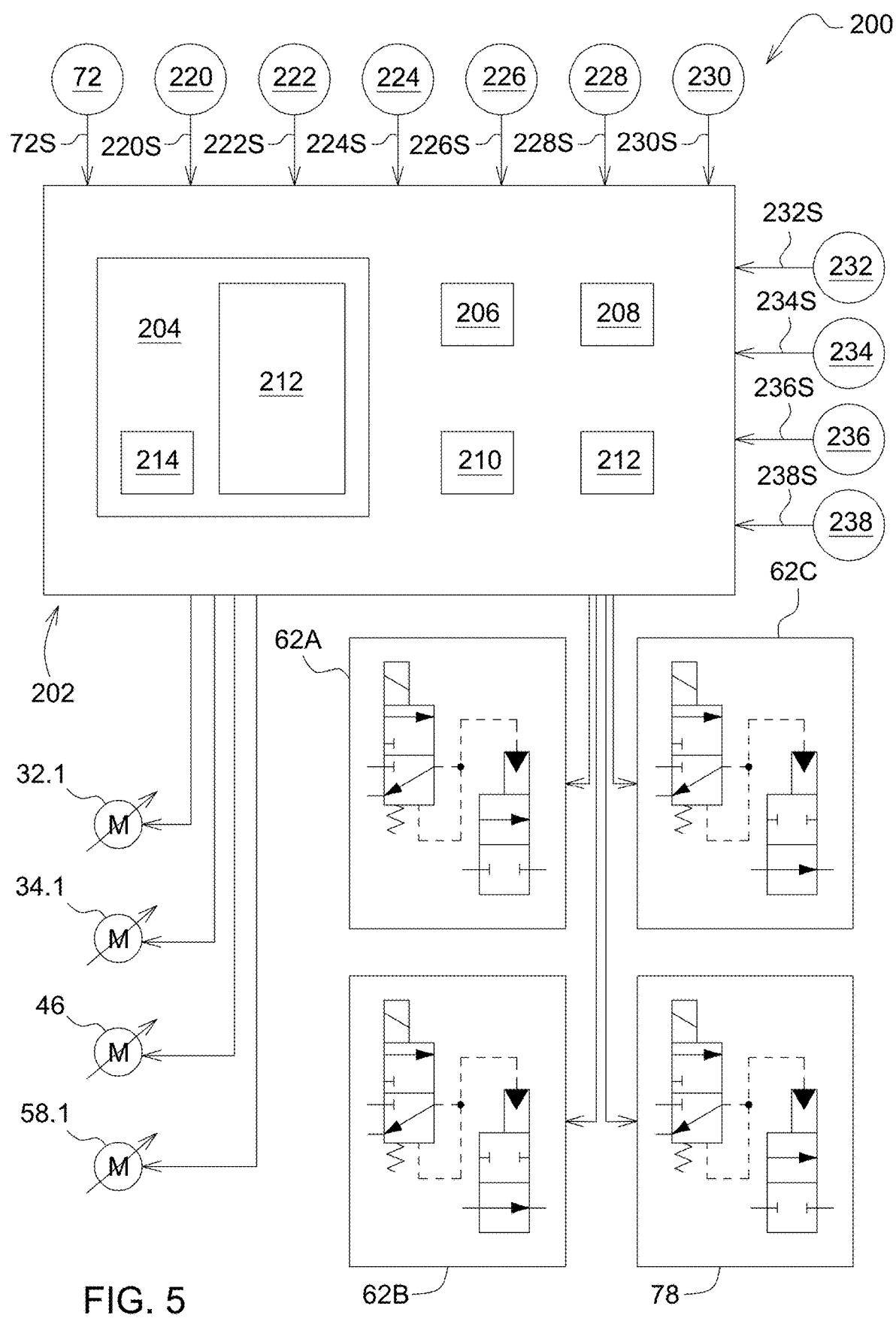
FIG. 5 is a schematic view of the control system of the work vehicle.

The Control System:

As schematically illustrated in FIG. 5, the work vehicle 10 includes a control system 200 including a controller 202. The controller 202 may be part of the machine control system of the work vehicle 10, or it may be a separate control module. The controller 202 may for example be mounted in a control panel 204 located at the operator's station 20. Controller 202 is functionally linked to the various sensors to receive input signals from various sensors. The signals transmitted from the various sensors to the controller 202 are schematically indicated in FIG. 5 by lines connecting the sensors to the controller with an arrowhead indicating the flow of the signal from the sensor to the controller 202.

For example, filter restriction sensor 72 may generate a differential pressure signal 72S corresponding to a differential pressure across filter 66.

The control system 200 may further include a plurality of state sensors 220, 222 and 224, each of the state sensors being associated with one or more of the vehicle drivetrain components 30, 32 and 34, and configured to generate a state signal 220S, 222S, 224S, corresponding to an operating state of its respective one or more vehicle drivetrain components.

The control system 200 may further include a main hydraulic fluid reservoir temperature sensor 226 and a conditioning hydraulic fluid reservoir temperature sensor 228 for sensing temperature of the hydraulic fluid in the respective reservoirs. Temperature signals 226S and 228S are provided from the temperature sensors to the controller 202.

The control system 200 may further include a pressure sensor 230 communicated with the conditioning hydraulic fluid discharge line 64 to monitor the conditioning hydraulic fluid pressure provided to the control manifold 62. A pressure signal 230S is provided to the controller 202.

The control system 200 may further include a vehicle state sensor 232 configured to detect a vehicle state and to send a vehicle state signal 232S to the controller 202. The vehicle state may for example be one of the states as shown in the following Table 1:

TABLE 1

| Tractor Vehicle States | |
| --- | --- |
| Key Switch State | |
| Off | Key off, but functionally able to initiate key on activity |
| Starting | Initiation to "start" tractor |
| Warm-up | Warm up state of fluids, cabin; full mission power disabled |
| Powered | Key on with intent to perform full mission power activity |

It is desired to know when the tractor 10 is intending on moving. As the tractor 10 is operated from a parked situation to a moving situation, lubricating oil is required when drive components are rotating. For fully autonomous operations, these commands are known by the central machine controller and can be communicated to the conditioning pump drive controller 202 via CAN or other protocol. The control system 200 may also include a separate tractor drive state sensor 234 configured to detect a tractor state and to send a tractor state signal 232S to the controller 202. The tractor state may for example be one of the states as shown in the following Table 2:

TABLE 2

| Traction Drive States | |
| --- | --- |
| Tractor Drive State | |
| Park | Vehicle speed is zero and the park brake is engaged |
| Neutral | Vehicle speed is zero and the park brake is disengaged |
| Forward | Forward direction is commanded |
| Reverse | Reverse direction is commanded |

It is desired to know when the tractor 10 is intending to operate the power take-off (PTO) 32. As the PTO 32 is transitioned from off to a non-zero speed, lubricating oil is required when drive components are rotating. For fully autonomous operations, these commands are known by the central machine controller and can be communicated to the conditioning pump drive controller 202 via CAN or other protocol. The control system 200 may further include a separate PTO drive state sensor 236 configured to detect a power take off (PTO) state and to send a PTO state signal 236S to the controller 202. The PTO drive state may for example be one of the states as shown in the following Table 3:

TABLE 3

PTO Drive States

| PTO Drive State | |
|---|---|
| OFF | PTO is not commanded to any speed |
| Power Zero | PTO speed is zero and being held by the e-Drive at zero |
| Forward 540 RPM | Forward direction is commanded at 540 rpm rated speed |
| Forward 1000 RPM | Forward direction is commanded at 1000rpm rated speed |
| Reverse | Reverse direction is commanded |

It is desired to know when the tractor 10 is intending to apply the service brake(s) 30. The service brakes 30 consist of a rotating disc mechanically connected to the output shaft that is compressed by a stationary piston creating relative friction which causes a drag on the rotating disc. During this actuation, heat is generated that can cause harm to the brake components. Therefore, cooling and lubricating oil is provided during brake actuation. For fully autonomous operations, these commands are known by the central machine controller and can be communicated to the conditioning pump drive controller 202 via CAN or other protocol. The control system 200 may further include a separate service brake state sensor 238 configured to detect a service brake state and to send a service brake state signal 238S to the controller 202. The service brake state may for example be one of the states as shown in the following Table 4:

TABLE 4

Service Brake States

| Brake State | |
|---|---|
| OFF | No brake actuation intended |
| ON | Brake actuation is intended, regardless of magnitude |

Similarly, the controller 202 will generate control signals for controlling the operation of various actuators of the work vehicle 10. Those actuators may for example include the various control valves 62A, 62B, and 62C and the recirculation valve 78. Those actuators may also include the electric motors 58.1, 32.1 and 34.1.

Controller 202 includes or may be associated with a processor 206, a computer readable medium 208, a data base 210 and the input/output module or control panel 204 having a display 212. An input/output device 214, such as a keyboard, joystick or other user interface, is provided so that the human operator may input instructions to the controller. It is understood that the controller 202 described herein may be a single controller having all of the described functionality, or it may include multiple controllers wherein the described functionality is distributed among the multiple controllers.

Various operations, steps or algorithms as described in connection with the controller 202 can be embodied directly in hardware, in a computer program product 218 such as a software module executed by the processor 206, or in a combination of the two. The computer program product 218 can reside in RAM memory, flash memory, ROM memory, EPROM memory, EEPROM memory, registers, hard disk, a removable disk, or any other form of computer-readable medium 208 known in the art. An exemplary computer-readable medium 208 can be coupled to the processor 206 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

The data storage in computer readable medium 208 and/or database 210 may in certain embodiments include a database service, cloud databases, or the like. In various embodiments, the computing network may comprise a cloud server, and may in some implementations be part of a cloud application wherein various functions as disclosed herein are distributed in nature between the computing network and other distributed computing devices. Any or all of the distributed computing devices may be implemented as at least one of an onboard vehicle controller, a server device, a desktop computer, a laptop computer, a smart phone, or any other electronic device capable of executing instructions. A processor (such as a microprocessor) of the devices may be a generic hardware processor, a special-purpose hardware processor, or a combination thereof.

Modes of Operation:

The hydraulic system 36 illustrated in FIGS. 2-4 is particularly useful in the context of a battery electric powered tractor 10. The conditioning pump 58 provides flow to critical lubrication points throughout the drivetrain system, thus ensuring proper lubrication of drivetrain internal components as well as providing cooling to bearings, shafts, and gear meshes. Oil is first passed through the filter 66 to ensure lubricating oil is clean of debris. The water-ethylene glycol to hydraulic oil heat exchanger 74 is housed in the circuit to act as a cooling source for the hydraulic oil. This ensures that the oil provided for lubrication is cool and clean. Oil is diverted to different lubrication circuits 88, 90, 92 within the drivetrain via the valve manifold 62. In addition, the valve manifold 62 provides control for oil to be circulated to the main hydraulic fluid reservoir 42. The recirculated oil from the conditioning circuit via low pressure return line 80 to the main hydraulic fluid reservoir 42 is the only source of heat exchange with the operating hydraulic fluid circuit 48, 50, 52, 54. Oil is returned to the conditioning hydraulic fluid reservoir 56 by air scavenge from the transaxle sump 28 and from the spill over tube 98 from the main hydraulic oil reservoir 42.

Differing from traditional traction lubricating systems, the pump 58.2 is driven by an electric machine 58.1. Use of an electric machine 58.1 to drive the conditioning pump 58.2 allows control flexibility and independence from other drive systems on the tractor 10. By utilizing different control strategies to drive the conditioning pump 58.2, energy savings can be realized as power into the lubricating system can be on-demand and only when needed. In all other times, the input energy to the lubricating system can be minimized.
Normal Mode of Operation:

FIG. 2 illustrates the arrangement of the hydraulic system 36 when the controller 202 is in a Normal Mode of operation. The controller 202 is configured to receive one or more of the state signals 232S, 234S, 236S and 238S from the plurality of state sensors 232, 234, 236 and 238, and at least in part in response to the one or more of the state signals to selectively open one or more of the control valves 62A, 62B, 62C to provide flow of conditioning hydraulic fluid to lubricate and cool any of the drivetrain components 30, 32, 34 which are in an active operating state and to close one or more of the control valves 62A, 62B, 62C to reduce or prevent flow of conditioning hydraulic fluid to any of the drivetrain components 30, 32, 34 which are not in an active operating state. In this Normal Mode of operation the recirculation valve 78 is typically in a open position so that the operating pressure in the conditioning hydraulic fluid discharge line 64 is determined by the setting of the low pressure relief valve 82. It is also possible, however, to close the recirculation valve 78 and provide conditioning hydraulic fluid at a higher pressure to the drivetrain components 30, 32, 34 using the control manifold 62 in the same manner.

In this Normal Mode of operation the controller 202 is further configured to vary a flow rate of the variable flow conditioning hydraulic fluid source 58 to provide the flow rate needed to lubricate and cool the vehicle drivetrain components 30, 32, 34 which are in the active operating state. By providing only the flow rate needed, energy consumption is minimized thus increasing the operating range of the battery electric powered vehicle 10. In one mode of operation the controller 202 may determine the flow rate needed to lubricate and cool the vehicle drivetrain components 30, 32, 34 which are in the active operating state from a lookup table stored in data base 210 or software 218. Such a look up table may be constructed from empirical data based on measurements of a flow rate needed to maintain each possible combination of actively operating drivetrain components plus the additional flow needed to maintain system pressure. In another embodiment the needed flow rate may be determined from an algorithm programmed in the software 218 of controller 202.

In the Normal Mode of operation the controller 202 may be described as providing a method of operating the vehicle 10 including:

sensing with a plurality of state sensors 232, 234, 236, 238 whether each of the plurality of drivetrain components 30, 32, 34 is in an active operating state and generating a state signal 232S, 234S, 236S, 238S corresponding to the operating state of each of the drivetrain components; and receiving the state signals 232S, 234S, 236S, 238S in the controller 202 and at least in part in response to the state signals automatically opening the control valve 62A, 62B, 62C, associated with any of the drivetrain components 30, 32, 34 which is in the active operating state to provide flow of conditioning hydraulic fluid to lubricate and cool any drivetrain component which is in an active operating state, and automatically closing the control valve associated with any of the drivetrain components which is not in the active operating state to reduce or prevent flow of conditioning hydraulic fluid to any drivetrain component which is not in the active operating state.

In the Normal Mode of operation the controller 202 may also be described as being configured to:

open the first control valve 62A to provide flow of conditioning hydraulic fluid to lubricate and cool the first drivetrain component 30 when the first drivetrain component 30 is actively operating and close the first control valve 62A to reduce or prevent flow of conditioning hydraulic fluid to lubricate and cool the first drivetrain component 30 when the first drivetrain component 30 is not actively operating;

open the second control valve 62B to provide flow of conditioning hydraulic fluid to lubricate and cool the second drivetrain component 32 when the second drivetrain component 32 is actively operating and close the second control valve 62B to reduce or prevent flow of conditioning hydraulic fluid to lubricate and cool the second drivetrain component 32 when the second drivetrain component 32 is not actively operating; and open the third control valve 62C to provide flow of conditioning hydraulic fluid to lubricate and cool the third drivetrain component 34 when the third drivetrain component 34 is actively operating and close the third control valve 62C to reduce or prevent flow of conditioning hydraulic fluid to lubricate and cool the third drivetrain component 34 when the third drivetrain component 34 is not actively operating.

The method may further be described as including varying a flow rate of the variable flow conditioning hydraulic fluid source 58 to provide the flow rate needed to lubricate and cool the vehicle drivetrain components 30, 32, 34 which are in the active operating state.

Warm-Up Mode and/or Recirculating Mode of Operation:

FIG. 2A illustrates the arrangement of the hydraulic system 36 when the controller 202 is in a Warm-Up Mode of operation which may also be referred to as a Recirculating Mode of operation. In this Warm-Up Mode of operation the recirculation valve 78 is in a closed position as shown in FIG. 2A so that the operating pressure in the conditioning hydraulic fluid discharge line 64 is determined by the setting of the high pressure relief valve 86. Furthermore, in the Warm-Up Mode of operation the conditioning hydraulic fluid is returned through the high pressure relief valve 86 and the high pressure return line 84 to the conditioning hydraulic fluid reservoir 56.

The high pressure return line 84 may also be referred to as a high pressure relief line 84. Preferably an outlet 85 of the high pressure relief line 84 is located adjacent to an inlet 87 of the conditioning hydraulic fluid suction line 60, so that in warm up mode the recirculation of the conditioning hydraulic fluid is enhanced. In one embodiment the outlet 85 of the high pressure relief line 84 is located not more than 24 inches from the inlet 87 of the conditioning hydraulic fluid suction line 87 in the conditioning hydraulic fluid reservoir 56. In another embodiment the high pressure relief line 84 may actually be connected to the conditioning hydraulic fluid suction line 60 at a location adjacent to the conditioning hydraulic fluid reservoir 56.

The controller 202 may be configured to close the recirculation valve 78 to enter the Warm-Up Mode or Recirculating Mode in response to detection of a triggering event by the controller 202.

The triggering event may for example be the detection of a start-up of the work vehicle 10 as indicated by the tractor vehicle state signal 232S. The controller 202 may be configured such that when the vehicle 10 is started up under certain conditions the Warm-Up Mode will be activated. The preferred conditions for running the Warm-Up Mode are when the work vehicle 10 is stationary and plugged into service power and capable of receiving electrical energy from an outside source such as a battery charger or grid power 240 as shown schematically in FIG. 1. When in this state the work vehicle 10 can use the energy from the outside source to pre-condition or warm up the fluid systems of the work vehicle 10. In this way, energy from the on-board battery system 24 can be saved for use in doing useful work, instead of taking battery system energy to warm and condition fluids on the work vehicle 10.

When in the Warm-Up Mode the controller 202 may be configured via the software programming 218 to monitor the conditioning hydraulic fluid reservoir temperature via temperature sensor 228 and the main hydraulic fluid reservoir temperature via temperature sensor 226.

When in the Warm-Up Mode the conditioning hydraulic fluid pump 58.2 may operate at a selected fixed speed with all of the control valves 62A, 62B and 62C closed. This will cause the conditioning hydraulic fluid to be pressurized by the pump 58.2 and to flow through the high pressure relief valve 86 to return to the conditioning hydraulic fluid reservoir 62. As the conditioning hydraulic fluid circulates through this loop it will be heated which in turn will cause the fluid in the conditioning hydraulic fluid reservoir 56 to be heated. The controller 202 may maintain the Warm-Up Mode until the conditioning hydraulic fluid reservoir temperature reaches a preset level as detected by temperature sensor 228.

The Warm-Up Mode of operation may be described as providing a method of:
 maintaining the recirculation valve 78 closed during a warm-up mode of operation so that conditioning hydraulic fluid from the conditioning hydraulic fluid discharge line 64 flows through the high pressure relief valve 86 to the conditioning hydraulic fluid reservoir 56 and recirculates from the conditioning hydraulic fluid reservoir 56 back to the variable flow conditioning hydraulic fluid source 58; and
 subsequent to the warm-up mode of operation, opening the recirculation valve 78 so that conditioning hydraulic fluid from the conditioning hydraulic fluid discharge line 64 flows through the low pressure relief valve 82 to the main hydraulic fluid reservoir 42.

If it is also desired to warm up the operating hydraulic fluid in the main hydraulic fluid reservoir 42 after the conditioning hydraulic fluid reservoir 56 has been warmed up, the recirculation valve 78 can then be opened to circulate warmed hydraulic fluid through the main hydraulic fluid reservoir 42.

Such a Warm-Up Mode may also be activated in response to detection by temperature sensor 228 of a conditioning hydraulic fluid temperature below a set temperature. In that case the triggering event may be the drop in temperature of the conditioning hydraulic fluid temperature below the set temperature.

A Recirculating Mode may be activated by the controller 202 in response to other triggering events. For example, if the filter 66 becomes plugged the filter restriction sensor 72 may detect the rise in pressure across the filter 66. The controller 202 may close the recirculation valve 78 in response to detecting this blockage of the filter 66, so as to prevent "dirty" hydraulic fluid from being passed through the main hydraulic fluid reservoir 42. It will be appreciated that the conditioning hydraulic fluid reservoir 56 is already exposed to relatively dirty hydraulic fluid returning through line 96 from transaxle sump 28, and thus returning any fluid bypassing filter 66 directly to the conditioning fluid hydraulic reservoir 56 will protect the main hydraulic fluid reservoir 42 from contamination.

System Function Check Mode:

The controller 202 may also be configured to provide a System Function Check Mode. The System Function Check Mode is intended to be used to ensure that the conditioning hydraulic fluid system 40 is functioning properly and that the pump 58.2, control valves 62A, 62B, 62C, and the associated electrical connections are in working order.

When in the System Function Check Mode the pump 58.2 may be operated at a fixed speed with all the control valves 62A, 62B, 62C closed. Then each valve in succession, is opened and closed while monitoring the lubrication system pressure via pressure sensor 230. The bypass valve 78 may be closed so that system pressure is controlled by the high pressure relief valve 86. When none of the control valves 62A, 62B, 62C are open, system pressure should be high as all hydraulic fluid is passing through the high pressure relief valve 86. Then as each individual valve 62A, 62B, 62C is opened, a new flow path is created which lowers the lubrication system pressure. Then as the valve is shut, the pressure should again rise to be at or near the high pressure relief valve setting. By monitoring each pressure drop and recovery for each associated valve, the system can be functionally checked to ensure that:
 The pump is operating and can generate relief pressure;
 The pressure sensor is functioning correctly;
 The electrical connections to the control valves are operating correctly;
 The pilot system to actuate the control valves is correctly operating; and
 The control valves both open and close properly.

Figure 6:
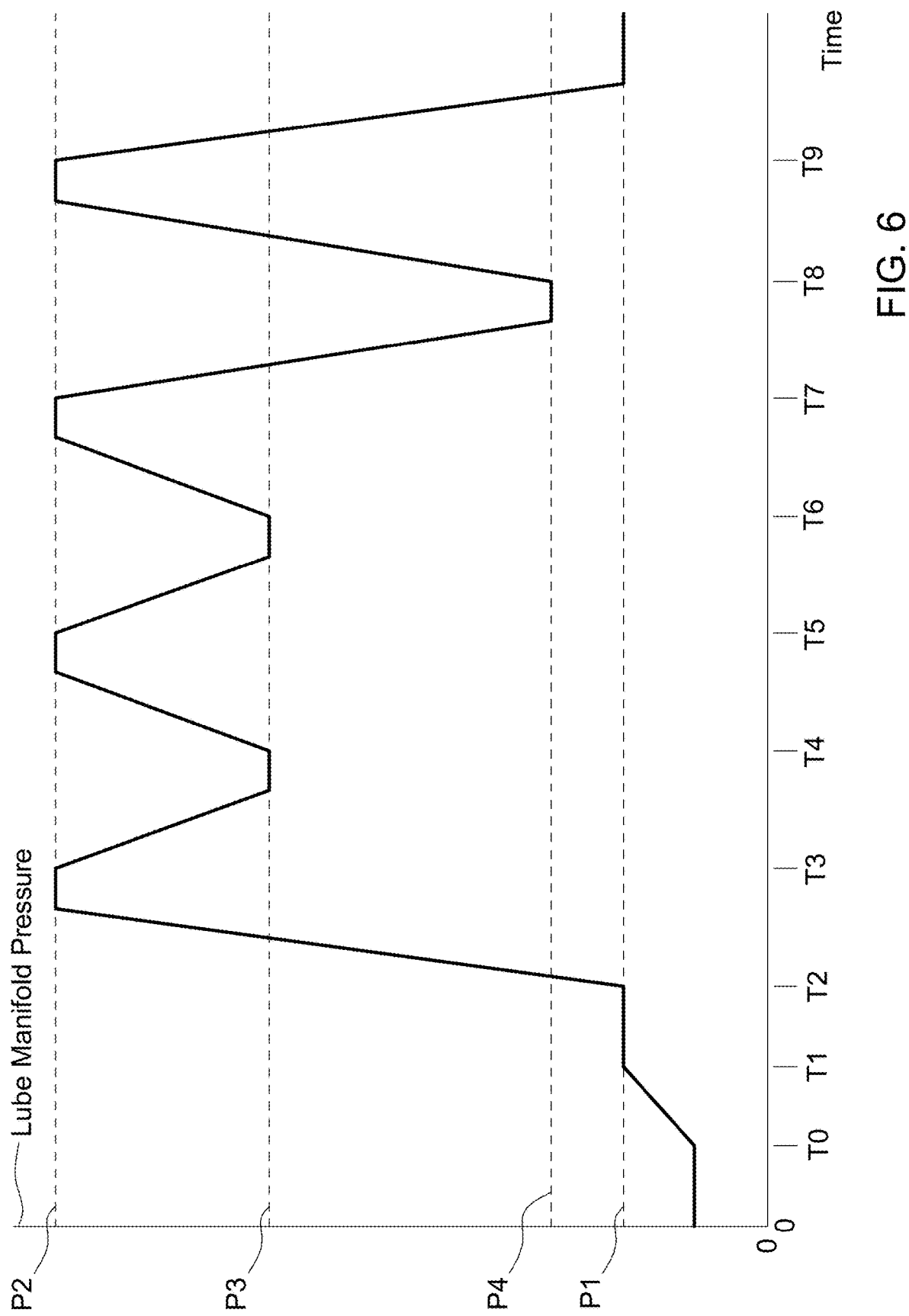
FIG. 6 is a graphical representation of conditioning hydraulic fluid system pressure during a system function check mode of the controller.

Such a test procedure is graphically shown in FIG. 6. The lubricating system pressure as detected by pressure sensor 230 is shown on the vertical axis. Time is shown on the horizontal axis. The test begins at time T0 with the pump 58.2 operating at a fixed speed and with the recirculating valve 78 open so that system pressure is controlled by the low pressure relief valve 82. From times T1 to T2 the system pressure is shown at the operating pressure P1 of the low pressure relief valve 82. The controller 202 will confirm whether the value P1 is within the acceptable operating pressure range for the low pressure relief valve 82.

At time T2 the recirculating valve 78 is closed so that the system operating pressure is now governed by the high pressure relief valve 86 and the pressure rises and levels off at the level indicated as P2. This is a test of the operation of the high pressure relief valve 86. The controller 202 will confirm whether the value P2 is within the acceptable operating range for the high pressure relief valve 86.

At time T3 the control valve 62A is opened to send lubricating and cooling fluid to the vehicle brake system 30. The pressure is shown to drop to the level P3 and then at time T4 the control valve 62A is closed and the pressure is shown to rise back to level P2.

At time T5 the control valve 62B is opened to send lubricating and cooling fluid to the PTO system 32. The pressure is shown to again drop to the level P3 and then at time T6 the control valve 62B is closed and the pressure is shown to rise back to level P2.

At time T7 the control valve 62C is opened to send lubricating and cooling fluid to the traction drive system 34. The pressure is shown to drop to the level P4 and then at time T8 the control valve 62C is closed and the pressure is shown to rise back to level P2.

Finally at time T9 the recirculating valve 78 is again opened and the operating pressure drops back to the level P1 as governed by the low pressure relief valve 82.

The controller 202 may be configured such that if for any valve actuation the pressure is 50% or more lower than the steady state pressure, the valve has been determined to open correctly. If the pressure returns to within 10% of the steady state pressure upon closing of the valve, the valve has been determined to close correctly.

When the controller 202 enters the System Function Check Mode the system may be monitored to confirm that conditioning hydraulic fluid pressure provided to the control valves achieves a preset operating pressure level. For example, upon entering into the System Function Check Mode, the pump 58.2 may transition to a preset operating speed. All control valves 62A, 62B, 62C may be closed. The lubrication system pressure may be monitored via pressure sensor 230 from the time T1 to the time T2. During the interval from T1 to T2 the controller may monitor average system pressure. That average system pressure may be considered the steady state lubrication system pressure, and it may be compared to a known steady state lubrication system pressure for a properly operating pump 58.2.

Such a System Function Check Mode may be described as providing a method whereby:
- with all the control valves 62A, 62B, 62C closed, operation of the variable flow conditioning hydraulic fluid source 58 is monitored to confirm that conditioning hydraulic fluid pressure provided to the control valves achieves a preset operating pressure level; and
- each of the control valves 62A, 62B, 62C is individually opened and closed, and pressure drop and recovery is monitored for each control valve.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A work vehicle, comprising:
   first and second vehicle drivetrain components;
   a main hydraulic fluid reservoir;
   a conditioning hydraulic fluid reservoir;
   a variable flow conditioning hydraulic fluid source configured to intake conditioning hydraulic fluid from the conditioning hydraulic fluid reservoir and provide the conditioning hydraulic fluid under pressure to a conditioning hydraulic fluid discharge line;
   a control manifold including first and second control valves configured to control flow of the conditioning hydraulic fluid from the conditioning hydraulic fluid discharge line to the first and second drivetrain components, respectively, to lubricate and cool the first and second drivetrain components;
   a filter disposed in the conditioning hydraulic fluid discharge line;
   a filter bypass configured to flow the conditioning hydraulic fluid through the conditioning hydraulic fluid discharge line without passing the conditioning hydraulic fluid through the filter when a pressure differential across the filter exceeds a set pressure differential value;
   a low pressure relief valve configured to communicate the conditioning hydraulic fluid discharge line with the main hydraulic fluid reservoir;
   a high pressure relief valve configured to communicate the conditioning hydraulic fluid discharge line with the conditioning hydraulic fluid reservoir; and
   a recirculation valve configured to selectively block flow through the low pressure relief valve and thereby cause flow from the conditioning hydraulic fluid discharge line to flow through the high pressure relief valve to the conditioning hydraulic fluid reservoir.

2. The work vehicle of claim 1, further comprising:
   a controller configured to close the recirculation valve at least in part in response to detection of a triggering event.

3. The work vehicle of claim 2, wherein:
   the detection of the triggering event includes detection of the pressure differential across the filter exceeding the set pressure differential value.

4. The work vehicle of claim 2, wherein:
   the detection of the triggering event includes detection of a conditioning hydraulic fluid temperature below a set temperature value.

5. The work vehicle of claim 2, wherein:
   the detection of the triggering event includes detection of a start-up of the work vehicle.

6. The work vehicle of claim 1, further comprising:
   a controller configured to close the recirculation valve during a warm-up mode of operation.

7. The work vehicle of claim 6, wherein:
   the controller is further configured to provide a normal operating mode during which the recirculation valve is open so that the conditioning hydraulic fluid from the conditioning hydraulic fluid discharge line returns through the low pressure relief valve to the main hydraulic fluid reservoir.

8. The work vehicle of claim 7, further comprising:
   a make-up line communicating the main hydraulic fluid reservoir with the conditioning hydraulic fluid reservoir such that excess hydraulic fluid in the main hydraulic fluid reservoir spills over into the conditioning hydraulic fluid reservoir.

9. The work vehicle of claim 6, wherein:
   the controller is further configured in the warm-up mode of operation such that:
   the warm-up mode of operation is performed when the work vehicle is stationary and connected to an external electrical power source;
   all of the control valves are closed;
   the recirculation valve is closed; and
   a conditioning hydraulic fluid reservoir temperature is monitored and the warm-up mode is maintained until the conditioning hydraulic fluid reservoir temperature reaches a preset level.

10. The work vehicle of claim 1, further comprising:
    a conditioning hydraulic fluid suction line communicating the conditioning hydraulic fluid reservoir with the variable flow conditioning hydraulic fluid source; and
    a high pressure relief line communicating the high pressure relief valve with the conditioning hydraulic fluid reservoir or the conditioning hydraulic fluid suction line.

11. The work vehicle of claim 10, wherein:
an outlet of the high pressure relief line is located not more than 24 inches from an inlet of the conditioning hydraulic fluid suction line in the conditioning hydraulic fluid reservoir.

12. The work vehicle of claim 1, wherein:
the control valves are on/off valves.

13. The work vehicle of claim 1, wherein:
the control valves are proportional control valves.

14. The work vehicle of claim 1, wherein:
the first and second vehicle drivetrain components are selected from the group consisting of a vehicle brake system, a power take off system, and a traction drive system.

15. The work vehicle of claim 1, further comprising: a controller configured to
vary a flow rate of the variable flow conditioning hydraulic fluid source to provide the flow rate needed to lubricate and cool the actively operating vehicle drivetrain components.

16. The work vehicle of claim 1, wherein:
the work vehicle is a battery electric vehicle; and
the first and second vehicle drivetrain components include first and second electric motors, respectively.

17. The work vehicle of claim 16, wherein:
the variable flow hydraulic fluid source includes a variable speed electric drive motor and a fixed displacement hydraulic pump driven by the variable speed electric drive motor.

18. A method of operating the work vehicle of claim 1, the method comprising:
maintaining the recirculation valve closed during a warm-up mode of operation so that conditioning hydraulic fluid from the conditioning hydraulic fluid discharge line flows through the high pressure relief valve to the conditioning hydraulic fluid reservoir and recirculates from the conditioning hydraulic fluid reservoir back to the variable flow conditioning hydraulic fluid source; and
subsequent to the warm-up mode of operation, opening the recirculation valve so that the conditioning hydraulic fluid from the conditioning hydraulic fluid discharge line flows through the low pressure relief valve to the main hydraulic fluid reservoir.

* * * * *